(12) United States Patent
Kato et al.

(10) Patent No.: US 8,850,207 B2
(45) Date of Patent: Sep. 30, 2014

(54) DATA RECORDING DEVICE, AND METHOD OF PROCESSING DATA RECORDING DEVICE

(75) Inventors: Taku Kato, Kamakura (JP); Yuji Nagai, Sagamihara (JP); Tatsuyuki Matsushita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/513,406

(22) PCT Filed: Mar. 22, 2012

(86) PCT No.: PCT/JP2012/058281
§ 371 (c)(1),
(2), (4) Date: Jan. 29, 2014

(87) PCT Pub. No.: WO2012/147445
PCT Pub. Date: Nov. 1, 2012

(65) Prior Publication Data
US 2014/0047240 A1 Feb. 13, 2014

(30) Foreign Application Priority Data

Apr. 28, 2011 (JP) .................................. 2011-102436

(51) Int. Cl.
*G06F 21/00* (2013.01)
*H04L 9/08* (2006.01)
*H04L 9/32* (2006.01)

(52) U.S. Cl.
CPC ............ *H04L 9/0869* (2013.01); *H04L 9/0866* (2013.01); *H04L 9/3263* (2013.01); *H04L 9/3247* (2013.01); *H04L 2209/60* (2013.01)
USPC ............... 713/171; 713/175; 726/19; 726/27; 380/201

(58) Field of Classification Search
USPC .......................................................... 713/171
See application file for complete search history.

(56) References Cited

U.S. PATENT DOCUMENTS 5,717,663 A 2/1998 Fujita
7,890,773 B2 2/2011 Kasahara et al.
(Continued)

FOREIGN PATENT DOCUMENTS

JP 2004 156456 6/2004
JP 2009 184176 8/2009
(Continued)

OTHER PUBLICATIONS

Office Action issued Sep. 25, 2012 in Japanese Application No. 2011-102436 (With English Translation).
(Continued)

*Primary Examiner* — Morshed Mehedi
(74) *Attorney, Agent, or Firm* — Oblon, Spivak, McClelland, Maier & Neustadt, L.L.P.

(57) ABSTRACT

A controller is provided with a controller key and a first controller identification information unique to the controller. The controller generates a controller unique key unique to a respective controller based on the controller key and the first controller identification information, and a second controller identification information based on the first controller identification information. A decryptor decrypts the encrypted medium device key using the controller unique key to obtain a medium device key. An authentication/key exchange process unit performs authentication/key exchange process with the host device through an interface unit using the medium device key, the medium device key certificate and the second controller identification information to establish a secure channel.

5 Claims, 7 Drawing Sheets

(56) References Cited

U.S. PATENT DOCUMENTS

| | | | |
|---|---|---|---|
| 7,966,000 B2 * | 6/2011 | Semple et al. | 455/411 |
| 8,208,531 B2 | 6/2012 | Uchimura et al. | |
| 8,238,554 B2 * | 8/2012 | Hori | 380/255 |
| 2006/0021063 A1 * | 1/2006 | Hori | 726/27 |
| 2007/0073624 A1 * | 3/2007 | Ishibashi et al. | 705/53 |
| 2007/0100759 A1 | 5/2007 | Kasahara et al. | |
| 2008/0133918 A1 * | 6/2008 | You et al. | 713/175 |
| 2009/0208007 A1 * | 8/2009 | Ohmori et al. | 380/201 |
| 2010/0246355 A1 | 9/2010 | Ueda et al. | |
| 2010/0268417 A1 | 10/2010 | Martin et al. | |
| 2010/0268948 A1 | 10/2010 | Matsukawa et al. | |
| 2010/0268953 A1 * | 10/2010 | Matsukawa et al. | 713/171 |
| 2011/0219232 A1 | 9/2011 | Yamaguchi et al. | |
| 2011/0238972 A1 * | 9/2011 | Semple et al. | 713/2 |
| 2013/0054971 A1 * | 2/2013 | Yamaguchi et al. | 713/171 |
| 2013/0061053 A1 * | 3/2013 | Yamaguchi et al. | 713/170 |
| 2013/0086385 A1 * | 4/2013 | Poeluev | 713/176 |

FOREIGN PATENT DOCUMENTS

| | | |
|---|---|---|
| JP | 2010 267240 | 11/2010 |
| JP | 2010 268417 | 11/2010 |
| JP | 2012-235513 A | 11/2012 |
| TW | 201037695 A1 | 10/2010 |
| TW | 201112009 A1 | 4/2011 |
| WO | 2011 108268 | 9/2011 |

OTHER PUBLICATIONS

Office Action issued Aug. 7, 2012 in Japanese Patent Application No. 2011-102436 with English language translation.
U.S. Appl. No. 13/524,532, filed Jun. 15, 2012, Kato et al.
U.S. Appl. No. 13/524,417, filed Jun. 15, 2012, Kato et al.
Office Action issued Nov. 22, 2013 in Japanese Patent Application No. 2012-262869 with English language translation.
"Media Identifier Management Technology Specifcation," 4C Entity, Revision 0.85 Preliminary Release, pp. i-x and 1-16, (Sep. 27, 2010).
International Search Report Issued May 1, 2012 in PCT/JP12/58281 Filed Mar. 22, 2012.
U.S. Appl. No. 13/520,092, filed Jun. 29, 2012, Nagai, et al.
U.S. Appl. No. 13/520,053, filed Jun. 29, 2012, Nagai, et al.
U.S. Appl. No. 13/520,051, filed Jun. 29, 2012, Nagai, et al.
Combined Office Action and Search Report issued Feb. 17, 2014 in Taiwanese Patent Application No. 101110277 with English language translation.

* cited by examiner

DATA RECORDING DEVICE, AND METHOD OF PROCESSING DATA RECORDING DEVICE

CROSS REFERENCE TO RELATED APPLICATIONS

This application is based on and claims the benefit of priority from prior Japanese Patent Application No. 2011-102436, filed on Apr. 28, 2011, the entire contents of which are incorporated herein by reference.

FIELD

Embodiments described herein relates to a data recording device, and a method of processing a data recording device.

BACKGROUND

In recent years, with the development of information-oriented society, content data distribution systems are widely used. The content data distribution systems deliver digitalized content data such as books, newspapers, music or moving pictures, and enable content data stored in a user terminal or in a storage medium through a user terminal to be viewed/listened in a user terminal or in a PC (personal computer) environment.

DETAILED DESCRIPTION

Figure 1:
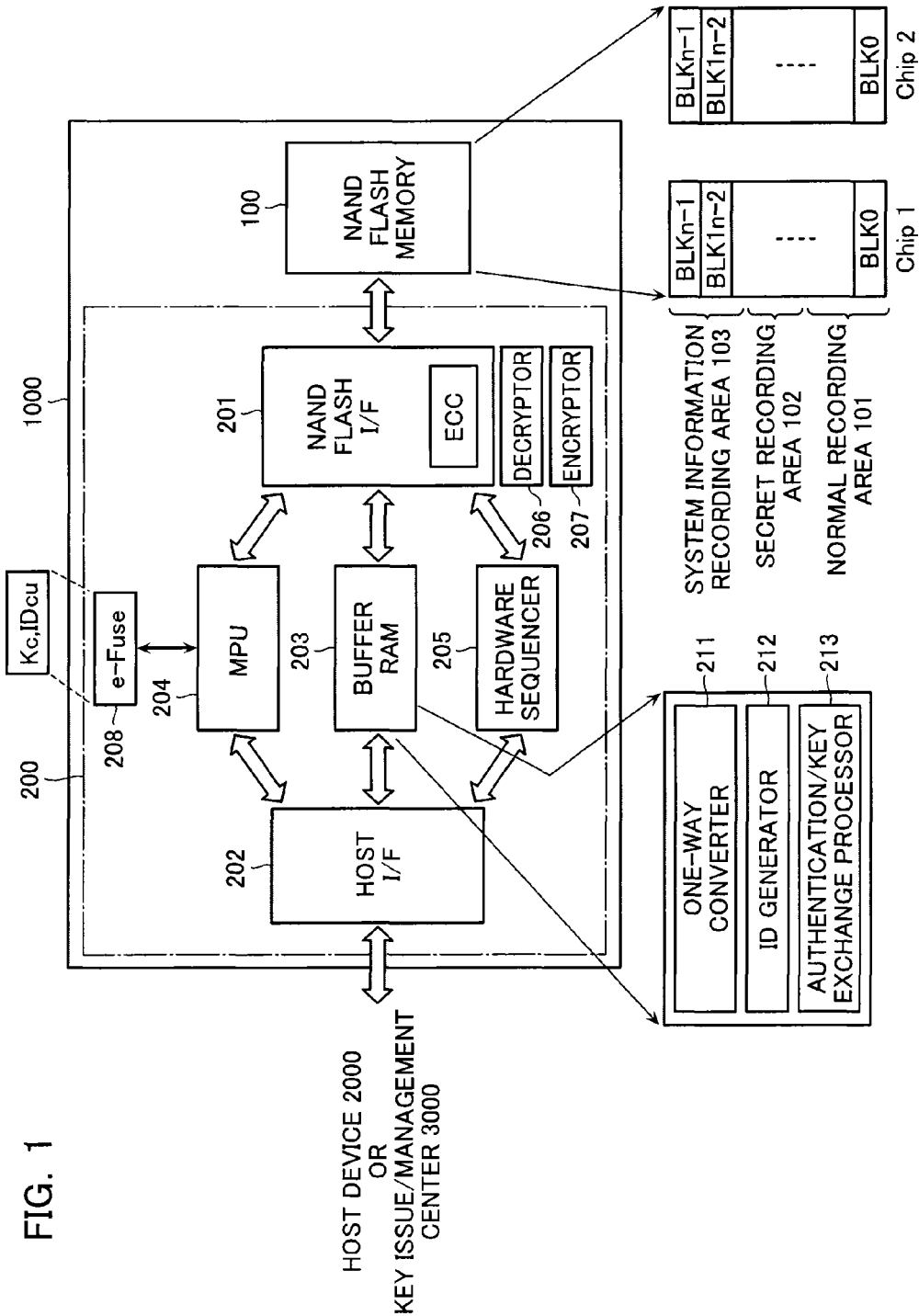
FIG. 1 is a block diagram illustrating a structure of a memory card 1000 used in an information recording system according to the first embodiment.

An data recording device according to an embodiment includes: a memory unit configured to store various types of data; a controller configured to control the memory unit; and an interface unit configured to perform data communication with a host device through a secure channel. The controller holds a controller key and a first controller identification information unique to the controller.

The controller further includes: a controller unique key generating unit configured to generate a controller unique key unique to a respective controller based on the controller key and the first controller identification information; a controller identification information generating unit configured to generate second controller identification information based on the first controller identification information; a decryptor; and an authentication/key exchange process unit configured to perform an authentication/key exchange process with the host device.

The memory unit further includes at least a normal recording area accessible freely from outside, a system information recording area, and a secret recording area. The secret recording area is accessible on the condition that a certain authentication process is completed. The system information recording area stores an encrypted medium device key and a medium device key certificate. The encrypted medium device key is a medium device key encrypted by the controller unique key. The medium device key functions as a private key of a public key cryptosystem. The medium device key certificate functions as a public key of the public key cryptosystem.

A decryptor is configured to decode to decrypt the encrypted medium device key using the Controller unique key to obtain a medium device key. In addition, the authentication/key exchange process unit is configured to perform authentication/key exchange process with the host device through the interface unit using the medium device key, the medium device key certificate and the second controller identification information. After a secure channel is established, the medium device key, the medium device key certificate and the second controller identification information are transmitted to a host device through the secure channel and the interface unit.

A method of processing the data recording device according to an embodiment described below is a method of performing an authentication process between the data recording device and a host device. The data recording device includes a memory unit, and a controller configured to control the memory unit.

The data recording device comprises a memory unit and a controller configured to control the memory unit. The data recording device is provided with a controller key and a first controller identification information. It also stores a medium device key functioning as a private key of public key cryptosystem and a medium device key certificate functioning as a public key of the public key cryptosystem in a system information recording area in the memory unit.

The medium device key is encrypted by a controller unique key generated based on the controller key and the first controller identification information, and is stored in the system information recording area as encrypted medium device key.

The host device holds a host device key functioning as a private key of the public key cryptosystem and a host device certificate functioning as a public key of the public key cryptosystem.

The method includes the following steps:
(1) generating second controller identification information based on the first controller identification information;
(2) performing an authentication/key exchange process using the encrypted medium device key, the medium device key certificate, the second controller identification information, the host device key, and the host device certificate to obtain, in the host device, medium device key certificate ID contained in the medium device key certificate and the second controller identification information; and
(3) generating data recording device identification information based on the medium device key certificate ID and the second controller identification information received by the host device.

Embodiments of the present invention will be described with reference to drawings.

Electronic content data (hereinafter referred to simply as "content") is easily duplicable so that unauthorized activities disregarding the copyright regarding the content may easily occur. From a point of view of protecting the content from such unauthorized activities, the content is usually encrypted and decrypted before being played back in a genuine device.

An encryption with double keys scheme has been proposed in which the content key for encrypting the content is doubly encrypted with two keys. Among the two encryption keys, a key unique to the storage medium (for example, a medium unique key) is securely recorded in a hidden area in a storage medium which cannot be accessed from outside of the storage medium. Accordingly, even if only encrypted content key data were copied falsely, for example, the content cannot be used (decrypted) without necessary medium unique key for decoding the encrypted content key data.

However, when such a medium unique key is read out falsely by a certain way, and is handed down to a manufacturer of fake storage medium (memory cards), it results in a diffusion of clone cards which are copies of authorized storage medium (memory cards). This means that content data is utilized falsely.

[First Embodiment]

FIG. 1 shows a structure of a memory card 1000 (a non-volatile memory system) used for the information recording system according to the first embodiment. This memory card 1000 is enabled to encrypt content data and store it. Note that the nonvolatile memory system does not necessarily have the shape of the memory card. The memory card 1000 may be implemented such that it is impossible to be attached or detached from a host device 2000.

Also, this memory card 1000 is configured to be connected to a host device 2000 (not illustrated in FIG. 1) and is enabled to perform a certain authentication/key exchange process with the host device 2000. When authentication/key exchange processing is completed, data write or read from the host device 2000 to a system information recording area and a secret recording area of the memory card 1000 becomes possible. Also, reading of data that is necessary for decryption of the encrypted content data stored in the memory card 1000 is made possible by the host device 2000 or a playback device connected to the host device 2000. This enables the playback of the content data.

In addition, the memory card 1000 according to the embodiment is configured to store a medium device key Kmd_i as a private key of a public key cryptosystem, and a medium device key certificate Cert$_{media}$ including a public key of the public key cryptosystem, for performing a authentication/key exchange process with the host device 2000. This will be described in detail later.

This memory card 1000 is composed of a NAND type flash memory 100 (hereinafter referred to as a memory 100), and a controller 200 for controlling a reading operation/write operation in the memory 100. Although a case is explained where the NAND type flash memory is adopted as an example of the memory 100 hereinbelow, other memory units (a magnetic disk drive apparatus, resistance change memory, ferroelectric memory, magnetic resistance memory, phase change memory) that may store data in a non-volatile manner may be adopted as a memory 100.

The controller 200 comprises a NAND flash interface 201 for performing data transfer with the memory 100, a host interface 202 for performing data transfer with an external device such as the host device 2000, a buffer RAM 203 for temporarily storing read data and write data, an MPU 204 for controlling data transfer, a hardware sequencer 205 used for sequential control of reading/writing of firmware (FW) in the NAND type flash memory 21 or the like, a decryptor 206, an encoder 207, and a fuse circuit 208.

The NAND flash interface 201 includes an error correction circuit (ECC). When data is written in the NAND flash memory, the NAND flash interface 201 calculates an error correcting code using the error correction circuit, and writes the data and the error correcting code in the NAND flash memory 21.

Also, when data is read from the NAND flash memory, the NAND flash interface 201 calculates a syndrome from the data and the error correcting code, thereby correcting the error of the data within a certain error-correcting capacity.

The firmware (FW) necessary for the controller 200 is automatically read from the memory 100 in an initialization operation (a power-on initial setup operation) performed automatically after power-on, and is transferred to the data register (buffer RAM) 203. This reading control is carried out by the hardware sequencer 205. Note that the firmware may be stored in a ROM in the controller 200. The firmware in this embodiment includes a one-way converter 211, an ID generator 212, an authentication/key exchange process unit 213, and the like, as described below.

The fuse circuit 208 stores a controller key Kc and a controller unique ID (IDcu) for identifying the controller 20. The controller key Kc and the controller unique ID (IDcu) are used to generate a controller unique key Kcu, as described below. When the above-mentioned medium device key Kmd_i is stored in a system information recording area 103 of the memory card 1000, the medium device key Kmd_i is encrypted using the controller unique key Kcu. The controller unique key Kcu is generated using the controller key Kc and the controller unique ID (IDcu) as input values into the one-way converter 211. That is, the one-way converter 211 is one example of the controller unique key generating unit for generating a controller unique key.

Also, the ID generator 212 (a controller identification information generating unit) generates a public control unique ID (IDcntr) to be transmitted to external, using the controller key Kc and the controller unique ID (IDcu) as input values thereto.

The authentication/key exchange process unit 213 performs an authentication/key exchange process with the host device 2000 based on the medium device key Kmd_i and the medium device key certificate Cert$_{media}$.

Figure 2:
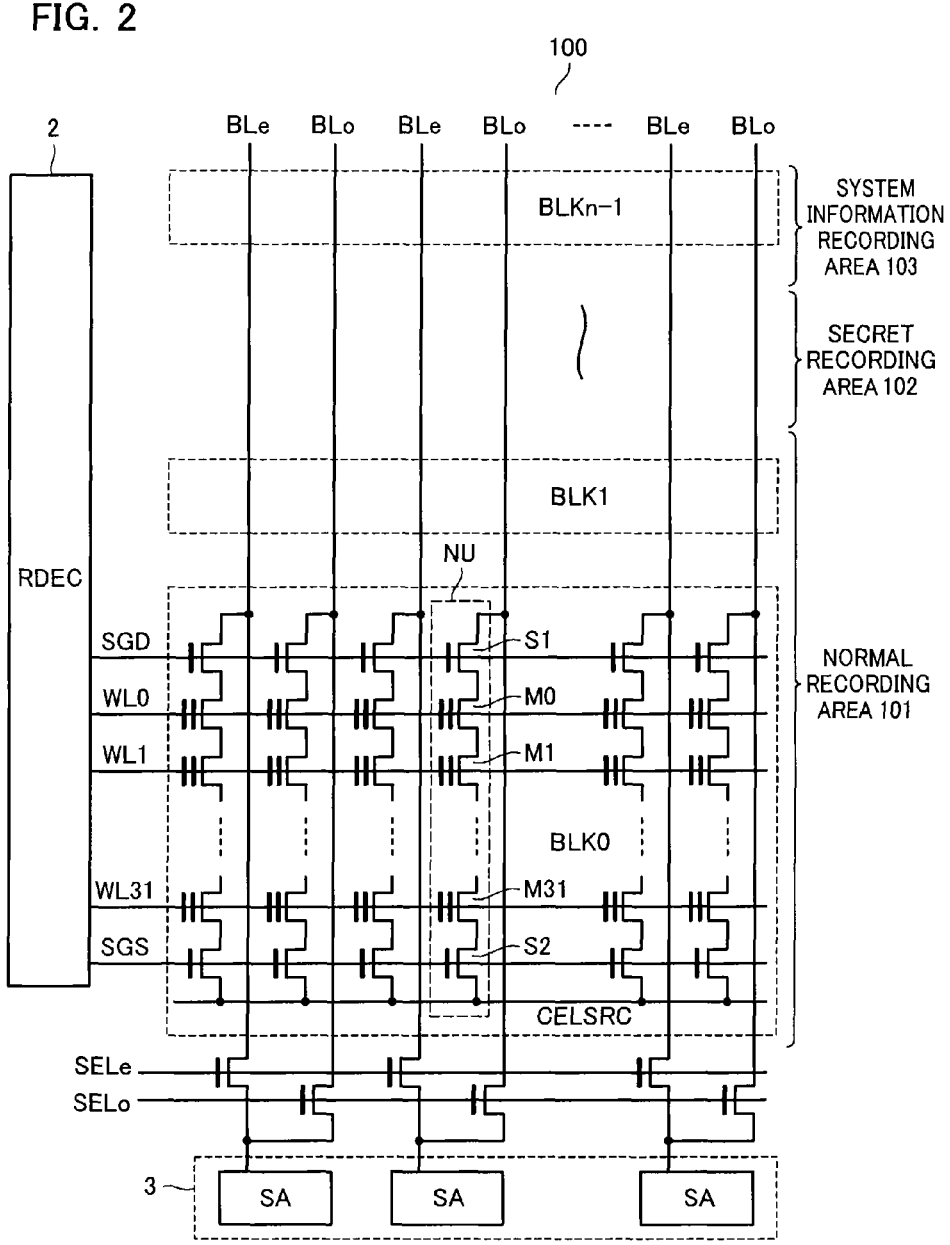
FIG. 2 is an equivalent circuit diagram illustrating a structure of the memory 100 (NAND type flash memory) of FIG. 1.

As shown in FIG. 2, the memory 100 is configured by arranging NAND cell units NU (an NAND string) NU in each of which a plurality of electrically-rewritable nonvolatile memory cells (in the example of the figure, 32 memory cells) M0-M31 are serially connected.

One end of the NAND cell unit NU is connected to a bit line BLo or BLe through a selection gate transistor S1, while the other end thereof is connected to a common source line CELSRC through a selection gate transistor S2. The control gates of the memory cells M0-M31 are connected to word lines WL0-WL31, respectively, and gates of the selection gate transistor S1 and S2 are connected to selection gate lines SGD and SGS.

A group of the NAND cell units arranged in a word-line direction comprises a block as the smallest unit for data erasure. As shown, a plurality of blocks BLK0-BLKn-1 are arranged in a bit-line direction. A part of blocks among the plural blocks is set as a normal recording area 101 that is freely accessible without a special authentication process, while another part thereof is set as a secret recording area 102 that becomes accessible after a predetermined authentication/ key exchange process. Further, another part thereof is set as a system information recording area 103 for recording information determined in advance at the time of memory-card production.

The normal recording area 101, the secret recording area 102, and the system information recording area 103 are assigned with logic addresses, respectively.

Designation of the logic address of the secret recording area 102 is permitted only when an authentication/key exchange process described below is completed.

Note that the normal recording area 101 may store 2 bits or more of data in one memory cell. On the other hand, the secret recording area 102 and the system information recording area 103 may store only 1-bit data in one memory cell in view of securing data-reliability.

Also, in the normal recording area 101, correspondency between a logic address and a physical address is dynamically changed depending on data update, while in the secret recording area 102 and system information recording area 103, it is possible to control the correspondency between the logic address and the physical address such that it is statically fixed, in view of security of data reliability.

A sense amplifier circuit 3 used for reading and writing of cell data is located at one end of the bit line BLe or BLo. Also, a row decoder 2 for selectively driving the word lines and the selection gate lines is located at one end of the word line. FIG. 2 shows a case where even-number bit lines BLe and odd-number bit lines BLo adjacent to each other are selectively connected to respective sense amplifiers SA of the sense amplifier circuit 3 by a bit line selection circuit.

Figure 3:
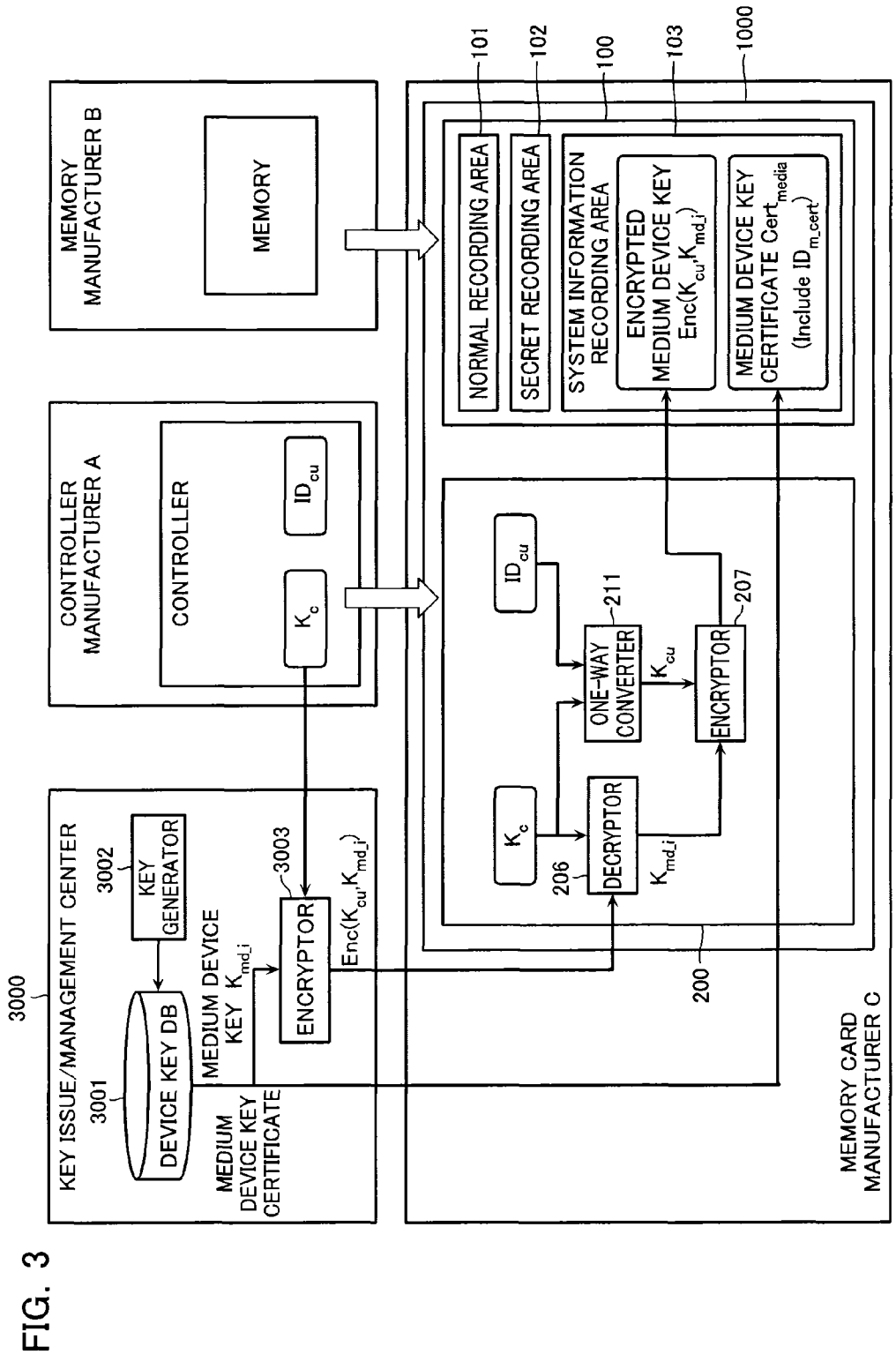
FIG. 3 is a schematic diagram describing a method of writing of encrypted medium device key and the medium device key certificate to the memory card 1000 in the first embodiment.

Referring now to FIG. 3, a method of manufacturing the memory card 1000, and a method of writing the medium device key Kmd_i and the medium device key certificate Cert$_{media}$ will be described. The medium device key Kmd_i and the medium device key certificate Cert$_{media}$ to be written in the memory card 1000 are provided from a key issue/management center 3000 to a memory card manufacturer C, and are written into the system information recording area 103 of the memory 100 included in the memory card 1000 through the controller 200. Although omitted in FIG. 1, the memory card 1000 is connected to an apparatus (a PC, a mobile-phone terminal, or a publicly-used terminal) having a certain communication function. Through an apparatus having such a communication function, data issued from the key issue/management center 3000 are written to the memory card 1000.

As described earlier, the medium device key Kmd_i is a private key of the public key cryptosystem, while the medium device key certificate Cert$_{media}$ is data including a public key corresponding to the medium device key Kmd_i as a private key. In the medium device key certificate Cert$_{media}$, a medium device key certificate ID (IDm_cert) is contained as identification information unique to the certificate.

In the production of memory card 1000, the controller 200 is provided from a controller manufacturer A, and the memory 100 is provided from a memory manufacturer B to a memory card manufacturer C. Note that two or all of the manufacturers A, B, and C may be the same company. The memory card manufacturer C writes information that is necessary for the memory 100, in order that the memory card 1000 is in an operable state.

The controller manufacturer A writes the controller key Kc and the controller unique ID (IDcu) in the controller 200 as secret information when the controller 200 is produced. The controller key Kc may be set as a common key among a plurality of the controllers 200 for the reason relating to the manufacturing process. On the other hand, different controllers 200 have different controller unique ID. That is, a controller unique key generated in one controller 200 is always different from a controller unique key generated in another controller 200.

The controller manufacturer A discloses data of the control key Kc given to the controller 200, to the key issue/management center 3000. Note that the controller key Kc may be transmitted from the controller manufacturer A to the key issue/management center 3000 using PGP cryptosystem or the like. The controller key Kc is secret information prepared for steadily writing the medium device key Kmd_i issued by the key issuance/management center 3000 to a controller manufactured by the controller manufacturer A. In some cases, it is possible to take a procedure in which the controller key Kc is generated in the key issuance/management center 3000, and then disclosed to the controller manufacturer A.

The key issue/management center 3000 comprises a managing key unit 3002 for generating a medium device key Kmd_i and medium device key certificate Cert$_{media}$, a device key database 3001 for managing the generated medium device key Kmd_i and the medium device key certificate Cert$_{media}$, and encryption unit 3003 encrypting the medium device key Kmd_i using the controller key Kc received from the controller manufacturer A.

The control key Kc is used for encrypting the medium device key Kmd_i in the key issue/management center 3000. The medium device key Kmd_i is generated in the key generator 3002, and then stored in the device key database 3001. The encryption unit 3003 is supplied with the corresponding medium device key Kmd_i from the device key database 3001, and encrypts it using the controller key Kc to generate encrypted medium device key Enc (Kc, Kmd_i).

The controller key Kc is information that only the controller manufacturer A and the key issue/management center 3000 may acquire. However, to reduce a damage when information on the controller key Kc is leaked to external by accident or by a certain reason, it is desirable that different controller keys KC(s) are used among different groups including a certain number of the controllers, for example in a unit of production lot.

Note that, in the key generator 3002 and the device key database 3001, not only the medium device key Kmd_i and the medium device key certificate Cert$_{media}$ for the memory card 1000 are generated and maintained, but also a host device key Khd_i or a host device certificate Cert$_{host}$ for the host device 2000 described later are generated and maintained in a similar way.

The memory card manufacturer C is supplied with the controller 200 from the controller manufacturer A, and receives from the key issue/management center 3000 a medium device key encrypted for the controller 200 (encrypted medium device key Enc (Kc, Kmd_i)), and a medium device key certificate Cert$_{media}$ corresponding to the medium device key. In order to receive a desired encrypted medium device key Enc (Kc, Kmd_i), a model number of the controller 200 or a production lot number thereof may be provided. This allows the medium device key encrypted by a precise controller key Kc to be received.

The encrypted medium device key Enc (Kc, Kmd_i) is temporarily written in the buffer RAM 203 of the controller 200. Then, the controller 200 decodes the encrypted medium device key Enc (Kc, Kmd_i) using the controller key Kc which it owns in the decryptor 206. The medium device key Kmd_i is thereby provided in the controller 200.

On the other hand, the one-way converter 211 operates a one-way function using the controller key Kc and the controller unique ID (IDcu) held in the controller 200 as input values thereto to generate a controller unique key Kcu. The medium device key Kmd_i is encrypted in the encryptor 207 again using this newly generated controller unique key Kcu, thereby generating an encrypted medium device key Enc (Kcu, Kmd_i).

This encrypted medium device key Enc (Kcu, Kmd_i) is stored in the system information recording area 103 of the memory 100 supplied by the memory manufacturer B. In this case, the medium device key certificate $Cert_{media}$ corresponding to the encrypted medium device key Enc (Kcu, Kmd_i) written in the system information recording area 103 is stored in the system information recording area 103 similarly.

The controller unique key (Kcu) is generated using the controller key Kc secretly stored in the controller 200 and the controller unique ID (IDcu). Accordingly, a risk of information necessary for decrypting the encrypted medium device key Enc (Kcu, Kmd_i) being leaked to external is small. It is extremely difficult to falsely perform re-encryption of the medium device key Kmd_i (after decryption by the original controller unique key Kcu1, encrypting it with another controller unique key Kcu2) in order that the encrypted medium device key Enc (Kcu, Kmd_i) once written in the memory 100 is made available in a separate controller 200.

In the first embodiment, a one-way function is used for generating the controller unique key Kcu from the controller key Kc and the controller unique ID (IDcu). However, it is possible to employ a function that can generate one piece of output data from two or more pieces of input data. The function is not limited to a one-way function.

Figure 4:
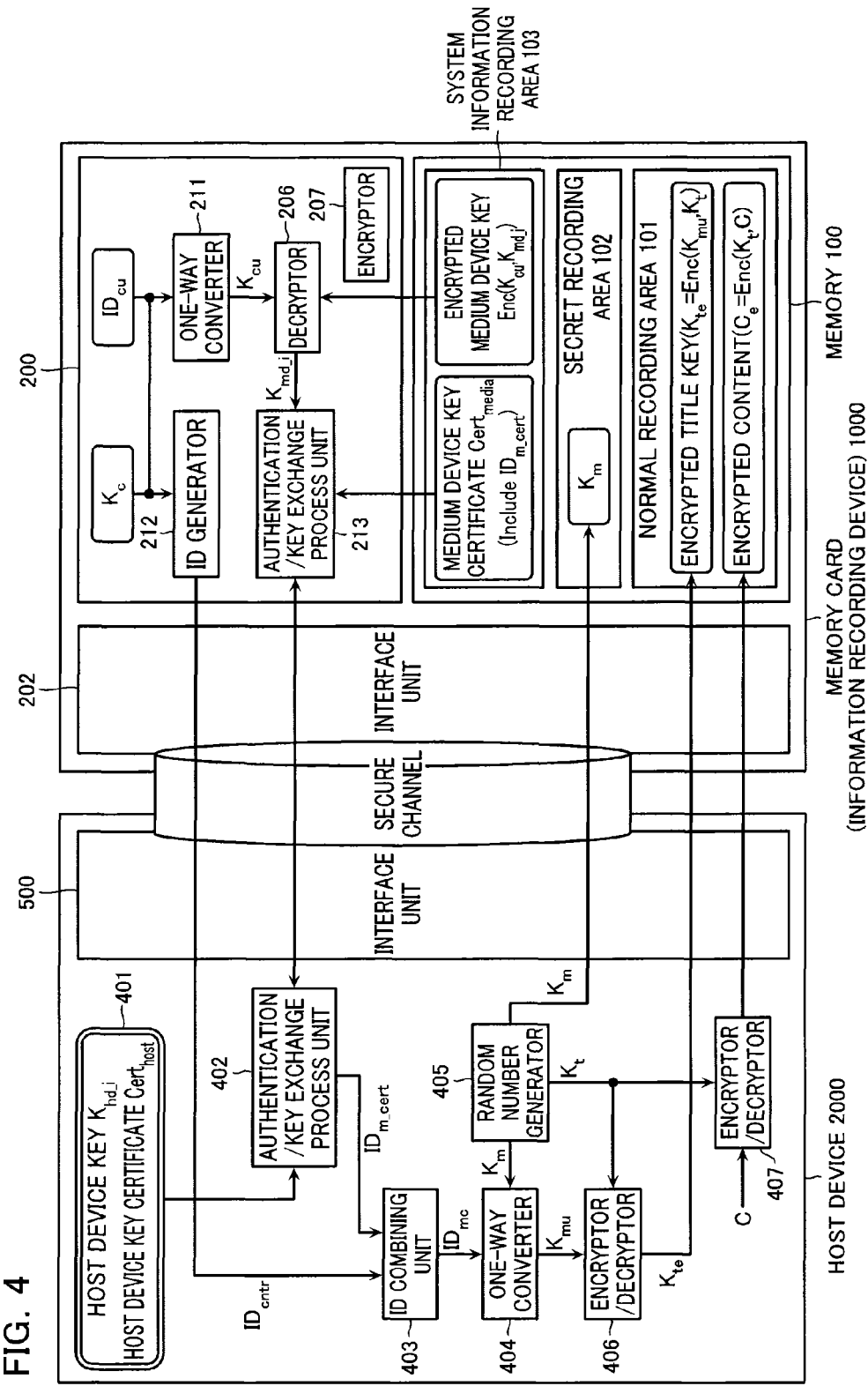
FIG. 4 is a block diagram illustrating a structure and operation of the memory card 1000 and a host device 2000 included in the information recording system according to the first embodiment.

Next, referring now to FIG. 4, the entire structure and the operation of the information recording system according to the first embodiment will be described.

As noted above, the memory card 1000 is provided with the encrypted medium device key Enc (Kcu, Kmd_i) and the medium device key certificate $Cert_{media}$. Such the memory card 1000 is connected to the host device 2000. This allows the memory card 1000 to be written with the content data C provided from the host device 2000, or to output the fetched content data C to the host device 2000 as shown in FIG. 4. The memory card 1000 and the host device 2000 together form an information recording system.

Here, a structure of the host device 2000 will be described. The host device 2000 comprises a holding unit 401, an authentication/key exchange process unit 402, an ID combining unit 403, a one-way converter 404, a random number generator 405, an encryptor/decryptor 406, and an encryptor/decryptor 407.

The holding unit 401 stores above-described host device key Khd_j and a host device certificate $Cert_{host}$. The host device key Khd_j is a private key of the public key cryptosystem, and the host device certificate $Cert_{host}$ is data including a public key that forms a pair with the host device key Khd_j. The authentication/key exchange process unit 402 has a function of performing an authentication/key exchange process with the authentication/key exchange process unit 213 of the memory card 1000, through an interface unit 500, 202 and a secure channel to output a medium device key certificate ID (IDm_cert). In addition, the ID combining unit 403 is configured to generate a memory card unique ID (IDmc) based on the public Controller unique ID (IDcntr) and the medium device key certificate ID (IDm_cert). This ID combining unit 403 functions as an identification information generating unit for generating a memory card unique ID (IDmc) based on the controller unique ID (IDcntr) and the medium device key certificate ID (IDm_cert). This ID combining unit 403 merely couples two IDs to generate another new ID. In place of such a simple combination, it is possible to generate a new ID using a one-way function or a cryptographic algorithm, for example.

The one-way converter 404 generates medium unique key Kmu using a one-way function, to which the memory card unique ID (IDmc) and a medium key Km generated at the random number generator 405 are input. The random number generator 405 generates a random number, and generates the medium key Km and a title key Kt based on the acquired random number. The encryptor/decryptor 406 encrypts the title key Kt by the above-mentioned medium unique key Kmu. In addition, the encryptor/decryptor 407 encrypts the content data C by the title key Kt (to obtain encrypted content data Enc (Kt, C)).

Note that, in the present embodiment, the medium unique key Kmu is generated by the host device 2000, and the medium unique key Kmu is used as an encryption key for encrypting the title key Kt. Similarly to the conventional content data protection technology, it is also possible to employ a scheme in which a medium unique key Kmu stored in the secret recording area 102 is directly used for encrypting the content data C.

Also, a double encryption key scheme is also available in which a user key Ku unique to a user is encrypted by a medium unique key Kmu, a content key Kct is encrypted by the user key Ku, and further content data is encrypted by the content key Kct. In addition, not only the medium key Km and the title key Kt may be generated in a host device, they may be written in the memory card in advance, or may be provided from an external device (not shown).

Next, an operation when content data C is written to the memory card 1000 from the host device 2000 will be described with reference to FIG. 4. First, the memory card 1000 generates the controller unique key Kcu from the controller key Kc and the controller unique ID (IDcu) using the one-way converter 211. Then, the encrypted medium device key Enc (Kcu, Kmd_i) is decoded using this controller unique key Kcu, thereby the medium device key Kmd_i being obtained. The medium device key Kmd_i and the medium device key certificate $Cert_{media}$ are transferred to the authentication/key exchange process unit 213.

On the other hand, the host device 2000 transfers the host device key Khd_j and the host device certificate $Cert_{host}$ to the authentication/key exchange process unit 402. The authentication/key exchange process is thereby performed in the authentication/key exchange process unit 213 and 402. When the process is completed, a secure channel is established between the memory card 1000 and the host device 2000. When secure channel is established, the ID generator 212 may output a public controller unique ID (IDcntr) which was generated by itself through an interface unit and through a secure channel.

When a secure channel is established, the ID generator 403 couples the public controller unique ID (IDcntr) and the medium device key certificate ID (IDm_cert) to generate the memory card unique ID (IDmc).

The host device 2000 generates the medium key (Km) using the random number generator 405, and stores the generated medium key Km in the secret recording area 102 of the memory card 1000 via the secure channel and the interface units 500 and 202.

The host device 2000 generates the medium unique key Kmu from the medium key Km and the memory card unique ID (IDmc) using the one-way converter 404.

The host device 2000 generates the title key Kt using the random number generator 405, and the title key Kt is further encrypted by the medium unique key Kmu using the encryptor/decryptor 406. The encrypted title key Kte=Enc (Kmu, Kt) is stored in the normal recording area 101 of the memory card 100.

The host device 2000 encrypts the content data C using the title key Kt, and the encrypted content data Ce=Enc (Kt, C) is stored in the normal recording area 101 of the memory card 1000. With the above-described processes, a record operation of the content data C is completed.

Figure 5:
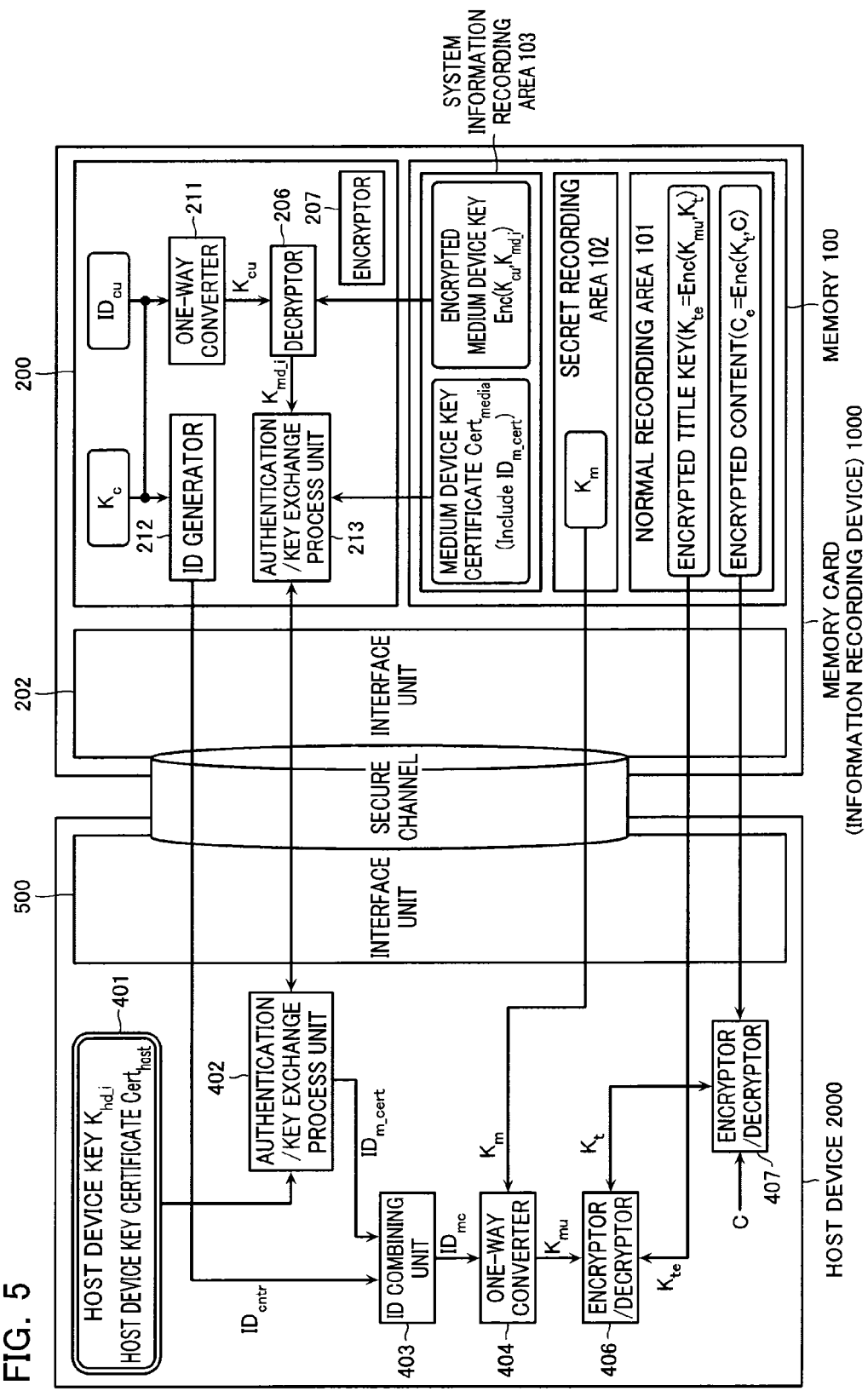
FIG. 5 is a block diagram illustrating a structure and operation of the memory card 1000 and a host device 2000 included in the information recording system according to the first embodiment.

Next, an operation when the content data C is read from the memory card 1000 to the host device 2000 will be described with reference to FIG. 5. The authentication/key exchange process in the authentication/key exchange process units 213 and 402, and the operation in the ID combining unit 403 are generally the same as in the write operation (FIG. 4).

When the authentication/key exchange process is completed, and thereby a secure channel is established, an access to the secret recording area 102 and the system information recording area 103 is enabled (that is, designation of a logic address of the secret recording area 102 and the system information recording area 103 becomes possible). In addition, the medium key Km stored in the secret recording area 102 of the memory card 1000 is provided to the one-way converter 404 of the host device 2000 through the secure channel. The one-way converter 404 generates the medium unique key Kmu using this medium key Km and the above-mentioned memory card unique ID (IDmc). The encryptor/decryptor 407 decodes the encrypted title key Enc (Kmu, Kt) stored in the memory card 100 using this medium unique key Kmu, thereby the title key Kt being obtained. Then, the encrypted content data Enc (Kt, C) stored in the memory card 100 is decoded using the provided title key Kt, thereby the content data C being obtained.

As explained above, in this embodiment, the medium device key Kmd_i and the medium device key certificate Cert$_{media}$ in accordance with the public key cryptosystem are used for the authentication/key exchange process. However, the controller unique ID (IDcntr) is generated based on the controller key Kc of the controller 200 and the controller unique key Kcu, and is supplied to the host device 2000 through a secure channel. Because it is transmitted through the secure channel, the controller unique ID (IDcntr) does not leak out outside, and the falsification is prevented. Also, based on this controller unique ID (IDcntr) and the medium device key certificate ID (IDm_cert), the memory card unique ID (IDmc) is generated by the ID combining unit 403. Based on this memory card unique ID (IDmc), the medium unique key Kmu of the memory 100 in the memory card 1000 is generated.

Thus, according to the present embodiment, even when an authentication/key exchange using the public key cryptosystem is processed, the controller unique ID (IDcntr) unique to the controller 200 can be interrelated with a pair of a public key and a private key, thereby spread of clone cards can be prevented.

[Second Embodiment]

Figure 6:
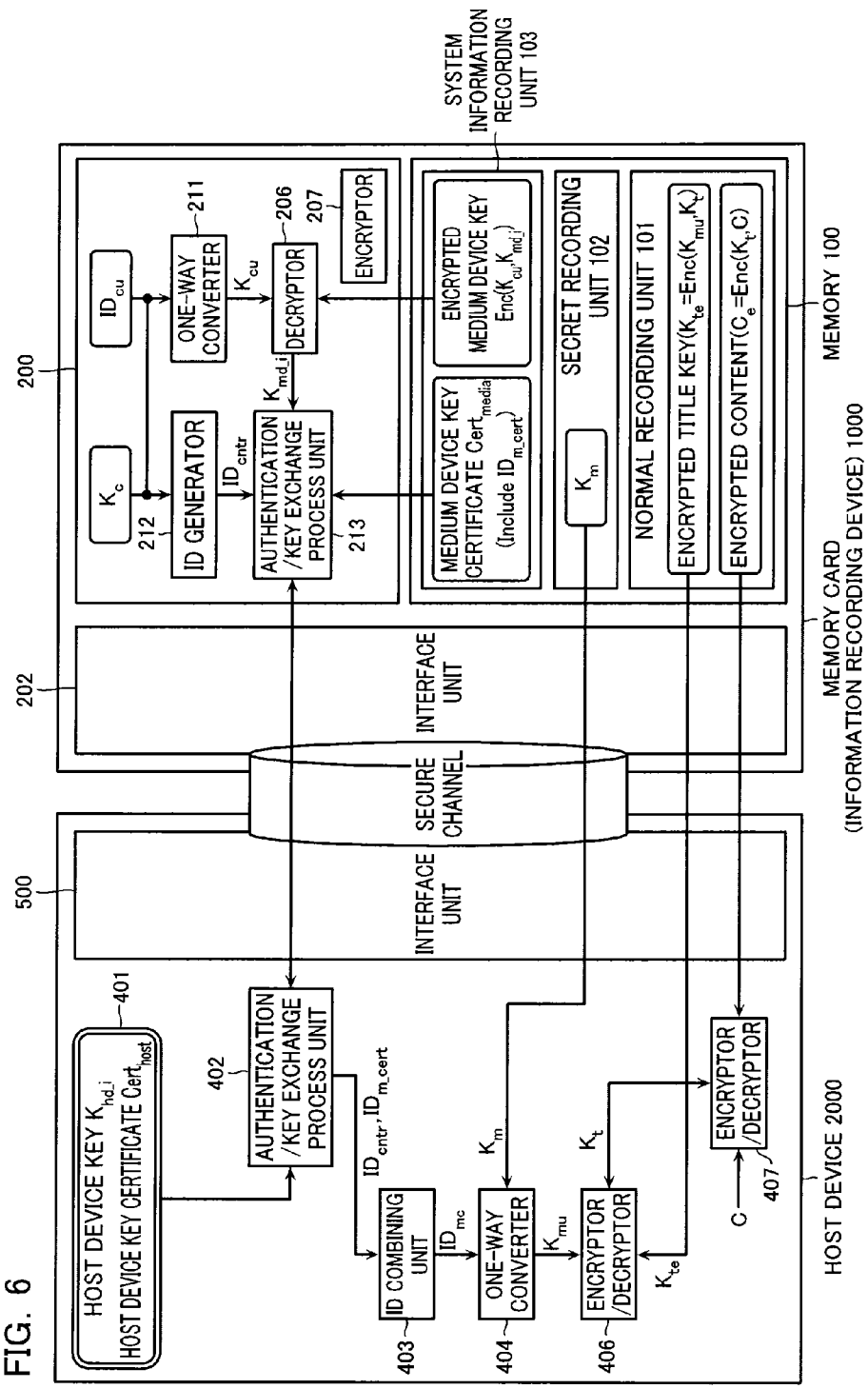
FIG. 6 is a block diagram illustrating a structure and operation of the memory card 1000 and a host device 2000 included in the information recording system according to the second embodiment.

FIG. 6 is a block diagram showing the structure of the information record system according to the second embodiment. Since the hardware structure thereof may be similar to those shown in FIG. 1 and FIG. 2, the explanation thereof is omitted hereinbelow. In this embodiment, as shown in FIG. 6, the operation of the authentication/key exchange process unit 213 is different. That is, the ID generator unit 212 in this embodiment does not directly transmit the controller unique ID (IDcntr) generated in the ID generator 212 to the host device 2000, but transmits it to the authentication/key exchange process unit 213 in the controller 200. Then, the controller unique ID (IDcntr) is used as one of the parameters of the authentication/key exchange process.

When the authentication/key exchange process is completed, the controller unique ID (IDcntr) is transmitted to the ID combining unit 403 with the medium device key certificate ID (IDm_cert). The operation thereafter is generally the same as the first embodiment.

Figure 7:
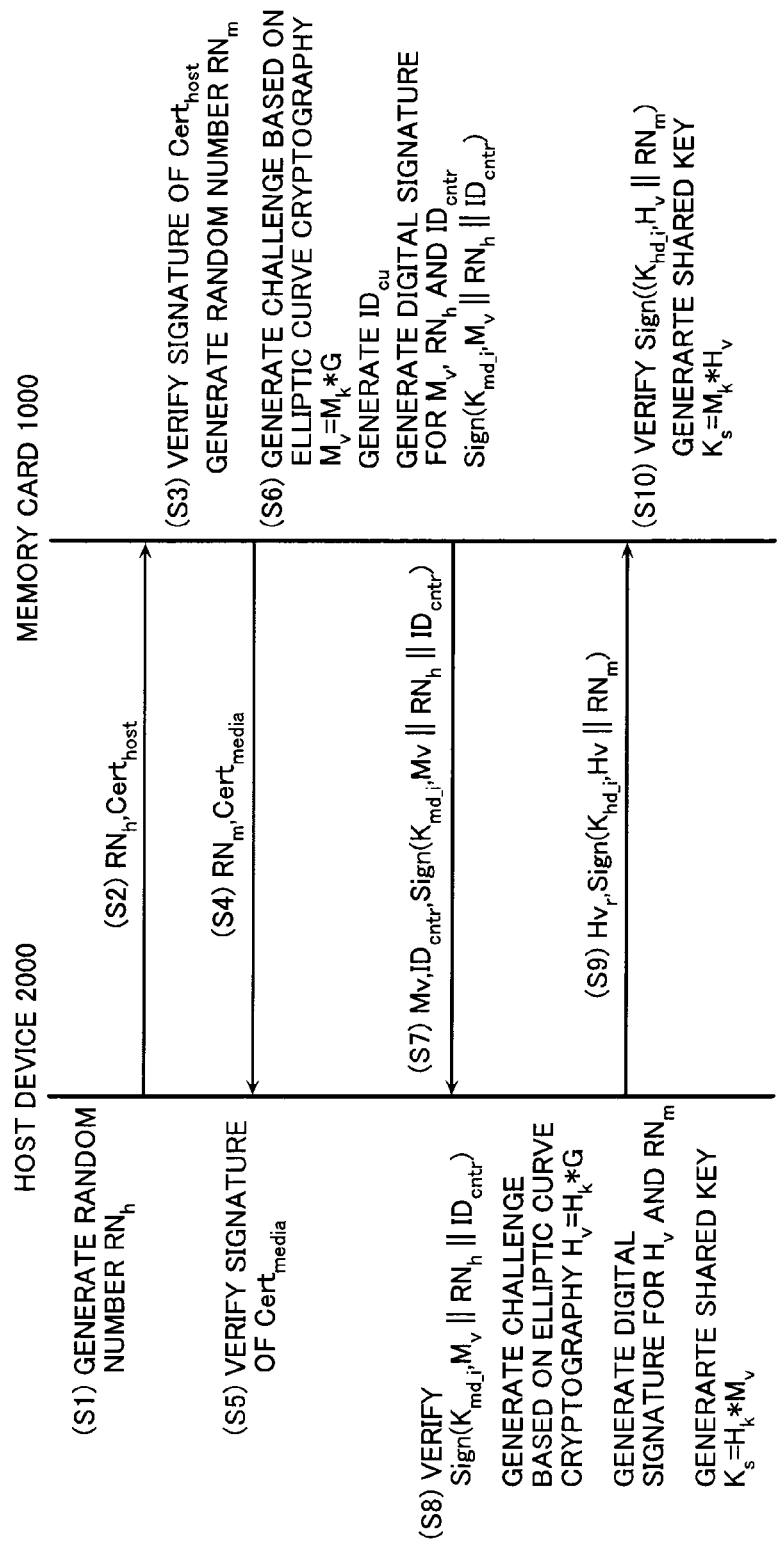
FIG. 7 is a flow chart illustrating an operation of the data recording system according to the second embodiment.

FIG. 7 describes procedures of an operation when a standard authentication/key exchange based on elliptic curve cryptography is used.

The host device generates a random number RNh (step S1), and transfers it to the memory card 1000 with the host device certificate Cert$_{host}$ (step S2). The memory card 1000 verifies a digital signature contained in the received host device certificate Cert$_{host}$, and generates a random number RNm (step S3).

Subsequently, the memory card 1000 sends the random number RNm and the medium device key certificate (Cert$_{media}$) to the host device (step S4). In response to this, the host device 2000 verifies a digital signature contained in the received medium device key certificate Cert$_{media}$. In time with step S4, the memory card 1000 generates a random number Mk necessary for Diffie-Hellman key exchange process in the elliptic curve cryptography. It also calculates a value for challenge Mv (=Mk*G) using a base point G of the elliptic curve. IDcntr is generated in the ID generator 212. In addition, using the medium device key Kmd_i, a digital signature for the value for challenge Mv, the random number RNh received in step S2 and the controller unique ID (IDcntr) is generated (step S6). The memory card 1000 sends the value for challenge Mv generated in step S6, the controller unique ID (IDcntr) and the digital signature generated in step S6 to the host device 2000 (step S7).

The host device 2000 verifies the signature received in step S7, generates a random number Hk necessary for Diffie-Hellman key exchange process in the elliptic curve cryptography, and calculates a value for challenge Hv (=Hk*G) using a base point G of the elliptic curve. Then, it generates a digital signature for the value for challenge Hv and the random number RNm received in step S4, using the host device key Khd_j, and calculates a shared key Ks (=Hk*Mv) shared by the authentication/key exchange process (step S8).

The host device 2000 sends the value for challenge Hv generated in step S8 and the digital signature to the memory card 1000 (step S9). In response to this, the memory card 1000 verifies the digital signature received in step S9, and calculates the shared Key Ks (=Mk*Hv).

When the signature cannot be inspected properly in the digital signature verification process in the above-described processes, the processes thereafter are aborted in any of the steps.

By performing the above-mentioned authentication/key exchange process, the memory card can share a shared key with the host device secretly. In the authentication/key exchange process, the shared Key is calculated using challenges generated by the host device and the memory card. Accordingly, the values of the shared key are different among different authentication/key exchange processes.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

For example, in the above-described embodiments, the controller unique ID (IDcntr) is generated based on a pair of the controller key Kc and the controller unique ID (IDcu) in the ID generator 212. However, in place of this, the controller unique ID (IDcntr) may be generated only based on the controller unique ID (IDcu). If another unique information that can be disclosed outside may be generated while the controller unique ID (IDcu) secretly stored in the controller 200 is kept in a secret state, a parameter used herein has no requirement. However, the function used for generation is an irreversible one such as a one-way function. That is it is necessary to select a function that prevent a reverse calculation based on the provided control unique ID (IDcntr) to obtain the original control unique ID (IDcu).

What is claimed is:

1. A host storing host key information and host certification information stored therein, the host comprising:
    a processing circuit configured to
        generate a first random number, and send to a medium the first random number and the host certification information with first signature information attached thereto, the first random number being used at the medium in a signature process using medium key information;
        receive, from the medium, a second random number, medium certification information stored in the medium, a first value calculated using a third random number different from the second random number and a base point of an elliptic curve, and unique ID information generated by executing a one-way function calculation based on controller key information and controller identification information stored in the medium;
        verify second signature information attached to the medium certification sent from the medium;
        generate a fourth random number, and calculate a second value using the fourth random number and the base point of the elliptic curve;
        perform a signature process for the second value and the second random number sent from the medium, using the host key information; and
        generate shared key information shared by a key exchange process between the host and the medium.

2. The host according to claim 1, wherein when verification of the second signature information has failed, a process after the verification is stopped.

3. The host according to claim 1, wherein the processing circuit is configured to generate the shared key information based on the fourth random number and the first value.

4. The host according to claim 1, wherein the processing circuit is configured to send the second value to the medium, and the processing circuit causes the medium to newly generate shared key information based on the third random number and the second value.

5. The host according to claim 1, wherein the processing circuit is configured to cause the shared key information to have a different value every time the key exchange process is performed.

* * * * *